(12) United States Patent
Dong

(10) Patent No.: US 10,356,209 B2
(45) Date of Patent: Jul. 16, 2019

(54) SYSTEM AND METHOD TO SUPPORT CONTEXT-AWARE CONTENT REQUESTS IN INFORMATION CENTRIC NETWORKS

(71) Applicant: Futurewei Technologies, Inc., Plano, TX (US)

(72) Inventor: Lijun Dong, San Diego, CA (US)

(73) Assignee: Futurewei Technologies, Inc., Plano, TX (US)

( * ) Notice: Subject to any disclaimer, the term of this patent is extended or adjusted under 35 U.S.C. 154(b) by 64 days.

(21) Appl. No.: 15/070,822

(22) Filed: Mar. 15, 2016

(65) Prior Publication Data

US 2017/0155738 A1 Jun. 1, 2017

Related U.S. Application Data

(60) Provisional application No. 62/260,844, filed on Nov. 30, 2015.

(51) Int. Cl.
*G06F 15/16* (2006.01)
*H04L 29/08* (2006.01)
(Continued)

(52) U.S. Cl.
CPC .......... *H04L 67/327* (2013.01); *H04L 67/02* (2013.01); *H04L 67/1097* (2013.01);
(Continued)

(58) Field of Classification Search
CPC ............ H04L 67/327; H04L 67/1097; H04L 67/2842; H04L 67/02; H04L 67/2814; H04L 67/2833; H04L 69/22; H04L 45/306
See application file for complete search history.

(56) References Cited

U.S. PATENT DOCUMENTS 9,426,113 B2 * 8/2016 Mahadevan .......... H04L 67/025
9,485,288 B2 * 11/2016 Kim .................... H04L 65/4084
(Continued)

FOREIGN PATENT DOCUMENTS

CN 103874157 A 6/2014
WO 2014139481 A1 9/2014

OTHER PUBLICATIONS

PCT/CN2016/106277, ISR, dated Feb. 9, 2017.
European Search Report, dated Sep. 21, 2018, for Application No. 16869885.0, 11 pages.

*Primary Examiner* — Kristie D Shingles
(74) *Attorney, Agent, or Firm* — Vierra Magen Marcus LLP

(57) ABSTRACT

The disclosure relates to technology for supporting context-aware content retrieval in a network. A router receives an interest message including a content name and a contextual requirement. Memory is accessed to determine whether the content name of the interest message matches a content name stored in the memory. In response to the content name matching the content name of the interest message, the router determines whether interfaces stored in the memory are associated with the content name. The contextual requirement in the interest message is matched with the contextual information associated with the interfaces stored in the memory, the interest message is forwarded to one of interfaces for which the contextual requirement in the interest message matches the contextual information of the interface(s) pertaining to the content. The router then aggregates the forwarded interest message including the contextual requirement with the pending interest message in the memory.

20 Claims, 10 Drawing Sheets

(51) Int. Cl.
*H04L 29/06* (2006.01)
*H04L 12/725* (2013.01)

(52) U.S. Cl.
CPC ...... *H04L 67/2814* (2013.01); *H04L 67/2833* (2013.01); *H04L 67/2842* (2013.01); *H04L 69/22* (2013.01); *H04L 45/306* (2013.01)

(56) References Cited

U.S. PATENT DOCUMENTS

| | | | |
|---|---|---|---|
| 9,503,365 B2 * | 11/2016 | Mahadevan | H04L 45/566 |
| 9,509,631 B2 * | 11/2016 | Lopez | H04L 47/805 |
| 9,537,719 B2 * | 1/2017 | Mahadevan | H04L 41/145 |
| 9,729,616 B2 * | 8/2017 | Mahadevan | G06F 17/30598 |
| 9,729,662 B2 * | 8/2017 | Mahadevan | H04L 67/2842 |
| 9,781,028 B2 * | 10/2017 | Ohnishi | H04L 45/14 |
| 9,787,618 B2 * | 10/2017 | Xu | H04L 51/14 |
| 9,819,643 B2 * | 11/2017 | Rangarajan | H04L 61/302 |
| 9,838,333 B2 * | 12/2017 | Ravindran | H04L 47/80 |
| 9,854,062 B2 * | 12/2017 | Yoneda | H04L 67/327 |
| 2013/0060962 A1 * | 3/2013 | Wang | H04L 67/327 709/238 |
| 2013/0275464 A1 | 10/2013 | Kim et al. | |
| 2014/0172981 A1 * | 6/2014 | Kim | H04L 65/4084 709/204 |
| 2014/0289325 A1 | 9/2014 | Solis et al. | |
| 2014/0365550 A1 | 12/2014 | Jang et al. | |
| 2015/0095483 A1 * | 4/2015 | Muramoto | G06Q 10/00 709/223 |
| 2015/0281079 A1 | 10/2015 | Fan et al. | |
| 2015/0350078 A1 * | 12/2015 | Azgin | H04L 45/306 370/392 |
| 2015/0358436 A1 * | 12/2015 | Kim | H04L 69/22 370/392 |
| 2015/0372947 A1 | 12/2015 | Xuan et al. | |
| 2016/0380986 A1 * | 12/2016 | Millar | G06F 21/606 713/171 |
| 2017/0093691 A1 * | 3/2017 | Garcia-Luna-Aceves | H04L 45/12 |
| 2017/0093713 A1 * | 3/2017 | Garcia-Luna-Aceves | H04L 45/50 |

* cited by examiner

DATA STRUCTURE 350

| NAME | DATA | CONTEXT |
|---|---|---|
| /example.com/movie1 | ... | Size > 1GB |

⎬ CONTENT STORE 305

| PREFIX | REQUESTING FACE(S) | CONTEXT |
|---|---|---|
| /example.com/movie1 | 0 | Size > 1GB |

⎬ PENDING INTEREST TABLE (PIT) 310

| PREFIX | FACE LIST | CONTEXT |
|---|---|---|
| /example.com/movie1 | 2 | Size > 1GB<br>Resolution = 1080p |

⎬ FORWARDING INFORMATION BASE (FIB) 315

FIG. 3

SYSTEM AND METHOD TO SUPPORT CONTEXT-AWARE CONTENT REQUESTS IN INFORMATION CENTRIC NETWORKS

CLAIM FOR PRIORITY

This application claims the benefit of priority to U.S. Provisional Application Ser. No. 62/260,844, filed Nov. 30, 2015, the contents of which are hereby incorporated by reference.

BACKGROUND

In an Information-Centric Network (ICN), also referred to as a content oriented network (CON), a domain-wide unique name is assigned to each entity that is part of a content delivery framework. The entities may comprise data content, such as video clips or web pages, and/or infrastructure elements, such as routers, switches, or servers. The content router uses name prefixes, which can be full content names or proper prefixes of content names instead of network addresses, to route content packets within the content network. In the ICN, content delivery including publishing, requesting, managing (e.g., modification, deletion, etc.) may be based on content name and not content location. One aspect of the ICN that may be different from traditional Internet Protocol (IP) networks is the ability of the ICN to interconnect multiple geographical points and cache content temporarily or store content on a more persistent basis. This may allow content to be served from the network instead of an original server. Accordingly, the caching/storing may be used for real time data that is fetched by the user or for persistent data that belongs to the user or to a content provider, e.g., a third party provider.

BRIEF SUMMARY

In one embodiment, there is a method for supporting context-aware content retrieval in a network, comprising receiving an interest message including a content name and a contextual requirement; accessing a memory, the memory including at least one of a content store caching content, a pending interest table (PIT) tracking pending interest messages and a forwarding information base (FIB) associating content information with one or more interfaces, to determine whether the content name of the interest message matches a content name stored in the memory; in response to a content name stored in the memory matching the content name of the interest message, determining whether one or more of the interfaces stored in the FIB are associated with the content name and matching the contextual requirement in the interest message with the contextual information associated with the one or more interfaces stored in the FIB; forwarding the interest message to one of the one or more interfaces for which the contextual requirement in the interest message matches the contextual information of the one or more interfaces related to the content; and aggregating the forwarded interest message including the contextual requirement with the pending interest message in the PIT, and storing the aggregated content in the PIT.

In another embodiment, there is A network component accessing context-aware content in a network, comprising a transceiver configured to receive and forward an interest message and content in the network; a memory storing a content store to cache content, a pending interest table (PIT) to track pending interest messages for content, and a forwarding information base (FIB) for associating contextual information with one or more interfaces; and a processor coupled to the memory and the transceiver configured to: access the memory to determine whether the content name of the interest message matches a content name stored in the memory; in response to a content name stored in the memory matching the content name of the interest message, determine whether one or more of the interfaces stored in the FIB are associated with the content name and matching the contextual requirement in the interest message with the contextual information associated with the one or more interfaces stored in the FIB; forward the interest message to one of the one or more interfaces for which the contextual requirement in the interest message matches the contextual information of the one or more interfaces related to the content; and aggregate the forwarded interest message including the contextual requirement with the pending interest message in the PIT, and storing the aggregated content in the PIT.

In still another embodiment, there is a non-transitory computer-readable medium storing computer instructions for supporting context-aware content retrieval in a network, that when executed by one or more processors, cause the one or more processors to perform the steps of: receiving an interest message including a content name and a contextual requirement; accessing a memory, the memory including at least one of a content store caching content, a pending interest table (PIT) tracking pending interest messages and a forwarding information base (FIB) associating content information with one or more interfaces, to determine whether the content name of the interest message matches a content name stored in the memory; in response to a content name stored in the memory matching the content name of the interest message, determining whether one or more of the interfaces stored in the FIB are associated with the content name and matching the contextual requirement in the interest message with the contextual information associated with the one or more interfaces stored in the FIB; forwarding the interest message to one of the one or more interfaces for which the contextual requirement in the interest message matches the contextual information of the one or more interfaces related to the content; and aggregating the forwarded interest message including the contextual requirement with the pending interest message in the PIT, and storing the aggregated content in the PIT.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the Background.

BRIEF DESCRIPTION OF THE DRAWINGS

Aspects of the present disclosure are illustrated by way of example and are not limited by the accompanying figures for which like references indicate like elements.

FIG. 3 illustrates a data structure maintained by a router of FIGS. 1 and 2.

DETAILED DESCRIPTION

Figure 1:
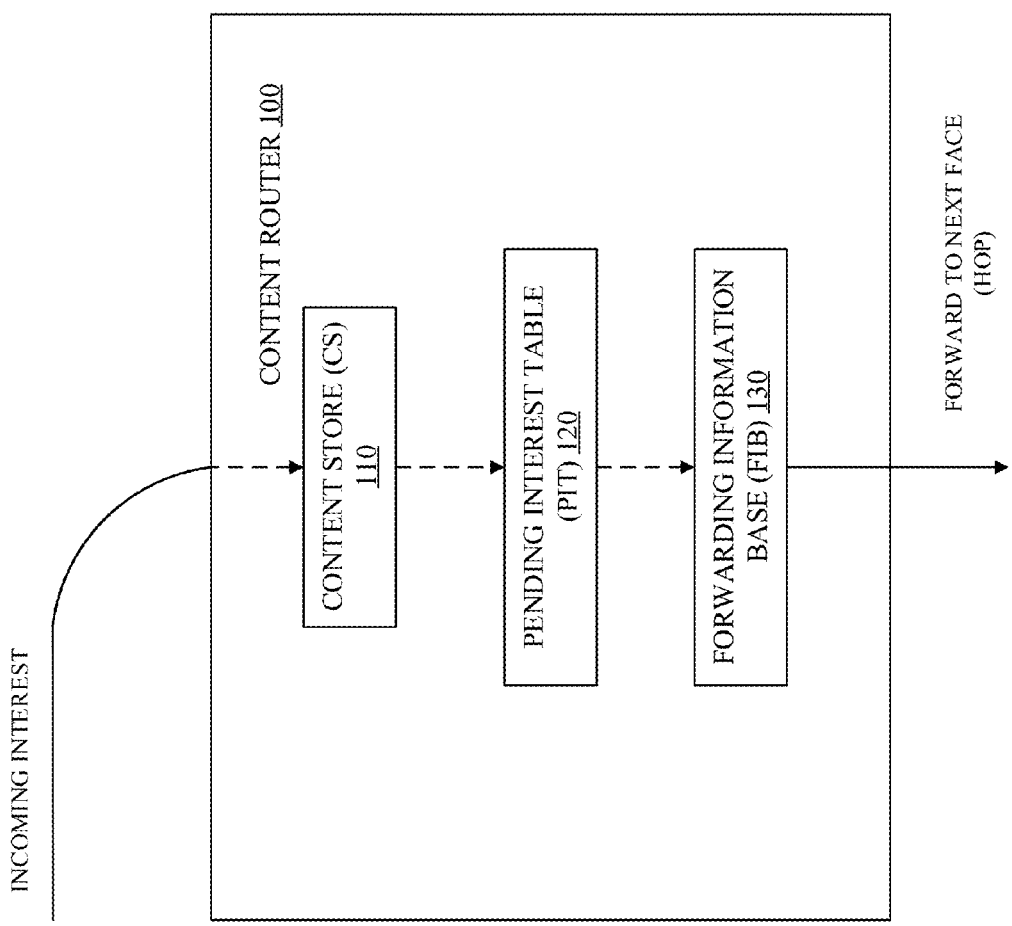
FIG. 1 illustrates an embodiment of a content router of an Information-Centric Network.

The disclosure relates to technology for supporting context-aware content retrieval in a network. A router receives an interest message including a content name and a contextual requirement. Memory is accessed to determine whether the content name of the interest message matches a content name stored in the memory. In response to the content name matching the content name of the interest message, the router determines whether one or more of the interfaces stored in the memory are associated with the content name. The contextual requirement in the interest message is matched with the content information associated with the one or more interfaces stored in the memory, the interest message is forwarded to one of interfaces for which the contextual requirement in the interest message matches the contextual information of the interface(s) pertaining to the content. The router then aggregates the forwarded interest message including the contextual requirement with the pending interest message in the memory.

It is understood that the present invention may be embodied in many different forms and should not be construed as being limited to the embodiments set forth herein. Rather, these embodiments are provided so that this disclosure will be thorough and complete and will fully convey the invention to those skilled in the art. Indeed, the disclosure is intended to cover alternatives, modifications and equivalents of these embodiments, which are included within the scope and spirit of the invention as defined by the appended claims. Furthermore, in the following detailed description of the present disclosure, numerous specific details are set forth in order to provide a thorough understanding of the present disclosure. However, it will be clear to those of ordinary skill in the art that the present disclosure may be practiced without such specific details.

Information-Centric Networking (ICN) has emerged as a promising candidate for the architecture of the future Internet, as well as the future Internet of Things (IoT). Different from today's IP routers, ICN routers may combine content routing, content computing power, and content local cache/storage capabilities. Achieving reliable and secure content distribution may be a challenge in ICN, such as when users have some control over content distribution. In some ICN models, such as content centric network (CCN)/named data networking (NDN) models, a content name (e.g., a prefix) may be used for content routing, which may define the content reachability to guide content retrieval from ICN routers. Internet routing protocols, such as Open Shortest Path First (OSPF) and Border Gateway Protocol (BGP), have been proposed to be extended to populate content prefix to every ICN router (e.g., within a network, domain, or group) for content routing operation.

As suggested above, ICN integrates name-based routing and in-network caching as fundamentals of the network infrastructure. There are several existing proposals for ICN, including NDN. In NDN, communications are driven by receivers, i.e. data consumers, through the exchange of two types of packets: interest packets (or messages) and data packets (or messages). In an Interest packet, a consumer places the name of a desired piece of data into the Interest packet and sends it to the network. Routers use the name to forward the Interest toward the data producer(s). In a Data packet, once the Interest reaches a node that has the requested data, the node will return the Data packet that contains both the name and the content, together with a signature by the producer's key which binds the two. The Data packet typically follows in reverse the path taken by the Interest to get back to the requesting consumer. This process is described in more detail below with reference to FIG. 1.

Within a context-aware content network, the term context may be any information that can be used to characterize the situation of an entity. The term entity may be, for example, a person, place, or object that is considered relevant to the interaction between a user and an application, including the user and applications themselves. Users often request content under certain contexts. For example, (1) a user may request a movie under the context represented by conditions such as: size <100 MB, size >2 GB and resolution=1080P; (2) retrieve temperature reading data under the context represented by conditions such as: value >90 F and value <30 F; (3) retrieve a coupon under the context represented by conditions such as: final price <$20 and store distance <30 miles.

Application layer protocols such as the Hypertext Transfer Protocol (HTTP) and the Constrained Application Protocol (CoAP) provide some context-aware support by making the requests conditional. For example, HTTP has the following headers:

If-Match request-header field. A client that has one or more entities previously obtained from the resource can verify that one of those entities is current by including a list of their associated entity tags in the If-Match header field.

If-Modified-Since request-header field. If the requested variant has not been modified since the time specified in this field, an entity will not be returned from the server.

If-None-Match request-header field. A client that has one or more entities previously obtained from the resource can verify that none of those entities is current by including a list of their associated entity tags in the If-None-Match header field. The purpose of this feature is to allow efficient updates of cached information with a minimum amount of transaction overhead.

If-Unmodified-Since request-header field. If the requested resource has not been modified since the time specified in this field, the server should perform the requested operation as if the If-Unmodified-Since header were not present.

Similar to HTTP, CoAP has the following options that could be included in the header:

If-Match Option maybe used to make a request conditional on the current existence or value of an ETag for one or more representations of the target resource.

If-None-Match Option may be used to make a request conditional on the nonexistence of the target resource.

Such application layer protocols require the underlying network protocols to support context-awareness. However, NDN as one of the candidates for underlying network protocols lacks the context-awareness support for a content request. Due to an unawareness of the context information, an NDN router may not be able to make the correct decisions on choosing the forwarding face when there are multiple producers for the requested content. Thus, if the content replied to the client does not satisfy the client's contextual requirements, the network bandwidth would have been wasted in transporting the Interest and the content. Alternatively, an NDN router can multicast the interest to all faces, which would increase the burden to the network since multiple matching content may be returned from multiple producers.

The described embodiments disclose the addition of context awareness to the content request in the ICN architecture (e.g., the NDN architecture), namely context awareness supported by the client, NDN router (as an example of ICN) and the content producer. On the client side, the contextual requirements are added into the content request Interest message. On the NDN router side, the procedures governing receipt of an Interest message with the contextual requirement, and receipt of a Data message are described. In particular, when a Data message is received, the NDN router learns the context information of a content regarding different producers, which are mapped to different forwarding faces. The learned context information is maintained in the FIB, which may assist the NDN router in deciding on the correct forwarding face for a content request with specific contextual requirement from the client. On the content producer side, the procedures of processing the Interest message with contextual requirement are also described below. The content producer may piggyback some relevant context information in the returned Data message, which can further assist the NDN routers in properly forwarding the future content requests.

FIG. 1 illustrates an embodiment of a content router of an Information-Centric Network. The content router 100 may collaborate for caching content with one or more other content routers (not shown) in a network, such as an ICN, which may be configured as follows. The content router 100 may comprise a content store (CS) 110, pending interest table (PIT) 120, and forwarding information base (FIB) 130. The CS 110 may be used (e.g., in a storage or memory unit) to cache (for relatively short time) or store (for relatively longer time) content data. The CS 110 may also receive and associate interests (user requests for content) with corresponding content data (requested content).

The PIT 120 may be any data structure (e.g., a table, list, or database) used to record and keep track of the received interests (requests for content) that are being served or pending (until the corresponding requested content data is received). The interests may be associated in the PIT 120 with the next hops (or next hop interfaces or faces) of the collaborative caching content router 100 on which the interests were received.

The FIB 130 may be any data structure (e.g., a table, list, or database) used to associate content with corresponding ports or faces (for next hops) on which the interests and content data are received and forwarded. The FIB 130 entries may indicate the next hops on which content (interests and data) may be forwarded. The FIB 130 may be a data structure or a sub-data structure (e.g. a data structure within a data structure, such as a table, list, or database (FIG. 2)) which may be maintained and operated (to process content interest and data) at a data plane or forwarding plane. The data plane may comprise operations for transferring content information (interest and data) in the CON, and the control plane may comprise operations related to controlling network operations including the data plane operations. The data structures above may be stored and maintained in a storage or memory unit of the content router 100.

To carry out the Interest and Data packet forwarding functions, the content router 100 (e.g., NDN router) maintains the three data structures described above, namely: (1) a CS 110 acting as a temporary cache of Data packets the router has received, which cached Data packets may be used to satisfy future Interests; (2) a PIT 120 to store all the Interests that a router has forwarded but not satisfied yet, where each PIT entry records the data name carried in the Interest, together with its incoming and outgoing interface(s); and (3) a FIB 130 as a routing table which maps name components to interfaces, and is populated by a name-prefix based routing protocol, and can have multiple output interfaces for each prefix. Additionally, the content router 100 may include forwarding policies and rules to handle forwarding of packets.

In one example embodiment, when the content router 100 receives an Interest packet (incoming interest), which includes for example the name of the content that the requester wants to request, the content router 100 first checks to determine if there is a locally cached copy of the content in the CS 110. If a locally cached copy of the content exists in the CS 110, the content router 100 can reply to the Interest by sending the content copy to the incoming face of the Interest.

If no locally cached copy of the content exists, the content router 100 checks to determine if there are pending interests in the PIT 120 with the same content name. If the same Interest exists and is pending, then the incoming face of the new Interest is added to the face list for the content name in the PIT 120. Accordingly, the new interest is no longer required to be forwarded.

Otherwise, the content router 100 forwards the Interest by performing a lookup, such as a longest-match lookup, in the FIB 130 based on the content name. The Interest is then stored in the PIT 120. If no matched entry is maintained in the FIB 130, then the Interest is forwarded to the faces other than the incoming face.

Figure 2:
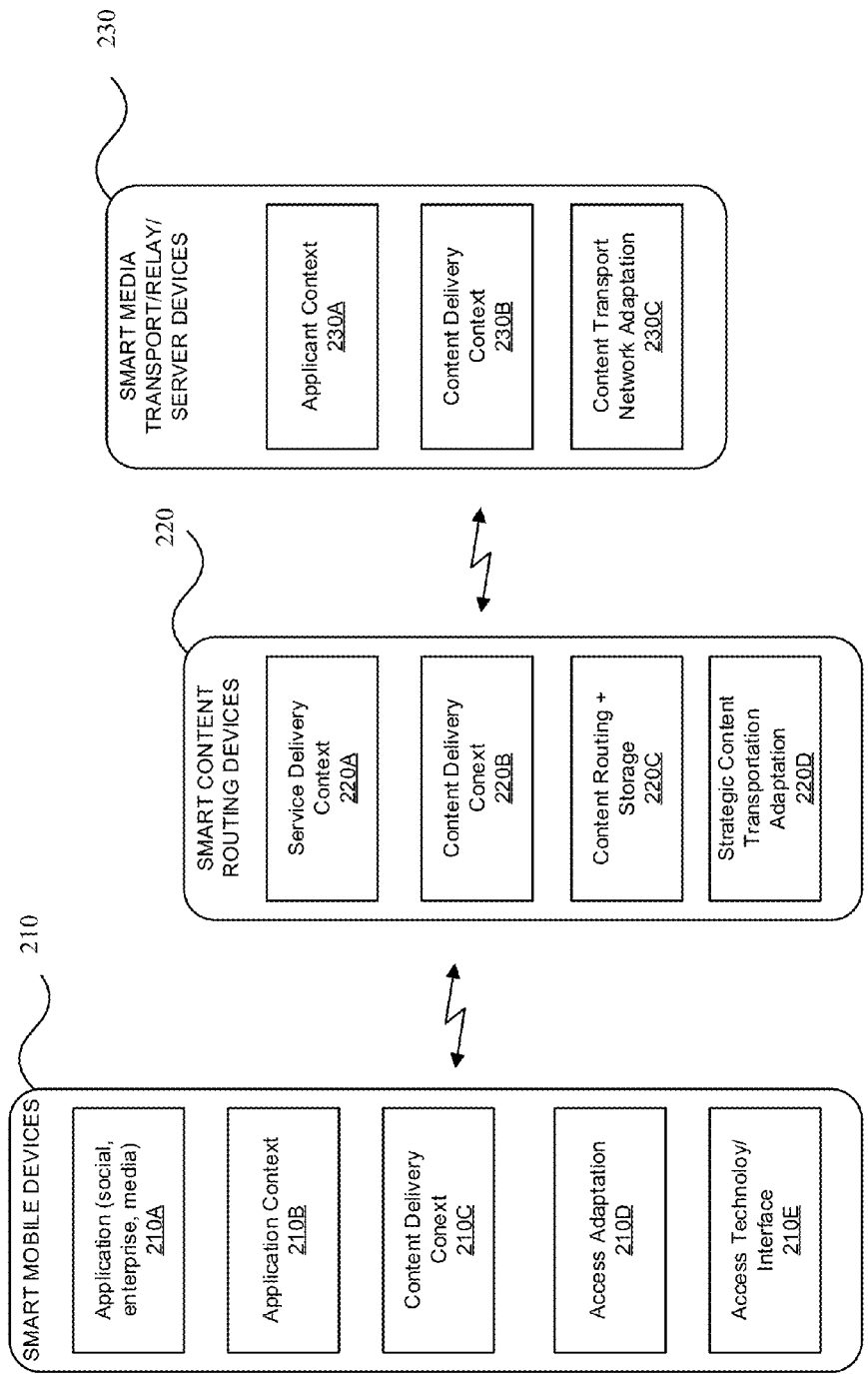
FIG. 2 illustrates an embodiment of an Information-Centric Network architecture in which the content router of FIG. 1 may be employed.

FIG. 2 illustrates an embodiment of a context aware ICN architecture. The context aware ICN architecture may be used to provide the context-based networking framework. The context aware ICN architecture may handle the mapping of different logical layers or services between user nodes 210 (e.g., smart mobile devices), content routing nodes 220 (e.g., smart content routing devices), and other transport/relay/service network nodes 230 (e.g., smart media transport/relay/server devices). The term "smart" is used herein to refer to devices configured for improved context handling, processing, routing, and caching/storing.

The user nodes 210 may comprise a plurality of logical blocks or components for context based services or operations, including application 210A, application context 210B, content delivery context 210C, access adaptation 210D, and access technology or interface 210E, such as wireless interfaces for mobile users (e.g., Near Field Communication (NFC), Bluetooth, Wireless Fidelity (WiFi), $3^{rd}/4^{th}$ generation mobile telecommunications (3G/4G)). The smart content routing devices 220 may also comprise a plurality of logical blocks or components for context based services or operations, including service delivery context 220A, content delivery context 220B, content routing and storage 220C, and strategic content transportation adaptation 220D. The transport/relay/server node 230 (e.g. smart media transport/relay/server devices) may also comprise a plurality of logical blocks or components for context based services or operations, including application context 230A, content delivery context 230B, and content transport network adaptation 230C.

FIG. 3 illustrates a data structure maintained by a router of FIGS. 1 and 2. In order to support context awareness from the client side, a client may initiate an Interest message with optional contextual requirements represented as conditions. For example, a condition may be represented by context name, operator and context value. The examples provided above with respect to context are representative, although not limiting, of the type of context name, operator and context value that may be applied. There could be multiple contextual requirements connected by operators, such as AND, OR, etc. For example, an Interest message with contextual requirements may appears as:

| Content Name |
| --- |
| Contextual Requirements in Conditions (An operational field: including, but not limited to, multiple requirements connected by AND, OR) (Condition is represented by context name + operator + context value) |

It is appreciated that conditions are not limited to context name, operators and context value.

In the example of FIG. 3, an ICN Router (e.g., an NDN router) is used for exemplary purposes. The NDN router maintains (stores) three data structures: CS 305, PIT 310 and FIB 315. These may be, for example, the same as CS 110, PIT 120 and FIB 130 disclosed in FIG. 1. Additionally, the relevant context information represented by the conditions is also respectively recorded in CS 305, PIT 310, and FIB 315. For example, the content name is "/example.com/movie1," where the contextual requirements are size >1 GB.

In the examples that follow, the procedures relate to an NDN router 100 receiving an Interest message with the contextual requirement. In response, the NDN router 100 will take actions on updating the PIT 310. Additionally, the procedures relating to an NDN router 100 receiving a Data message are described, such that the NDN router 100 takes action to update the CS 305, PIT 310 and FIB 315. It is appreciated that the examples that follow are non-limiting.

Figure 4A:
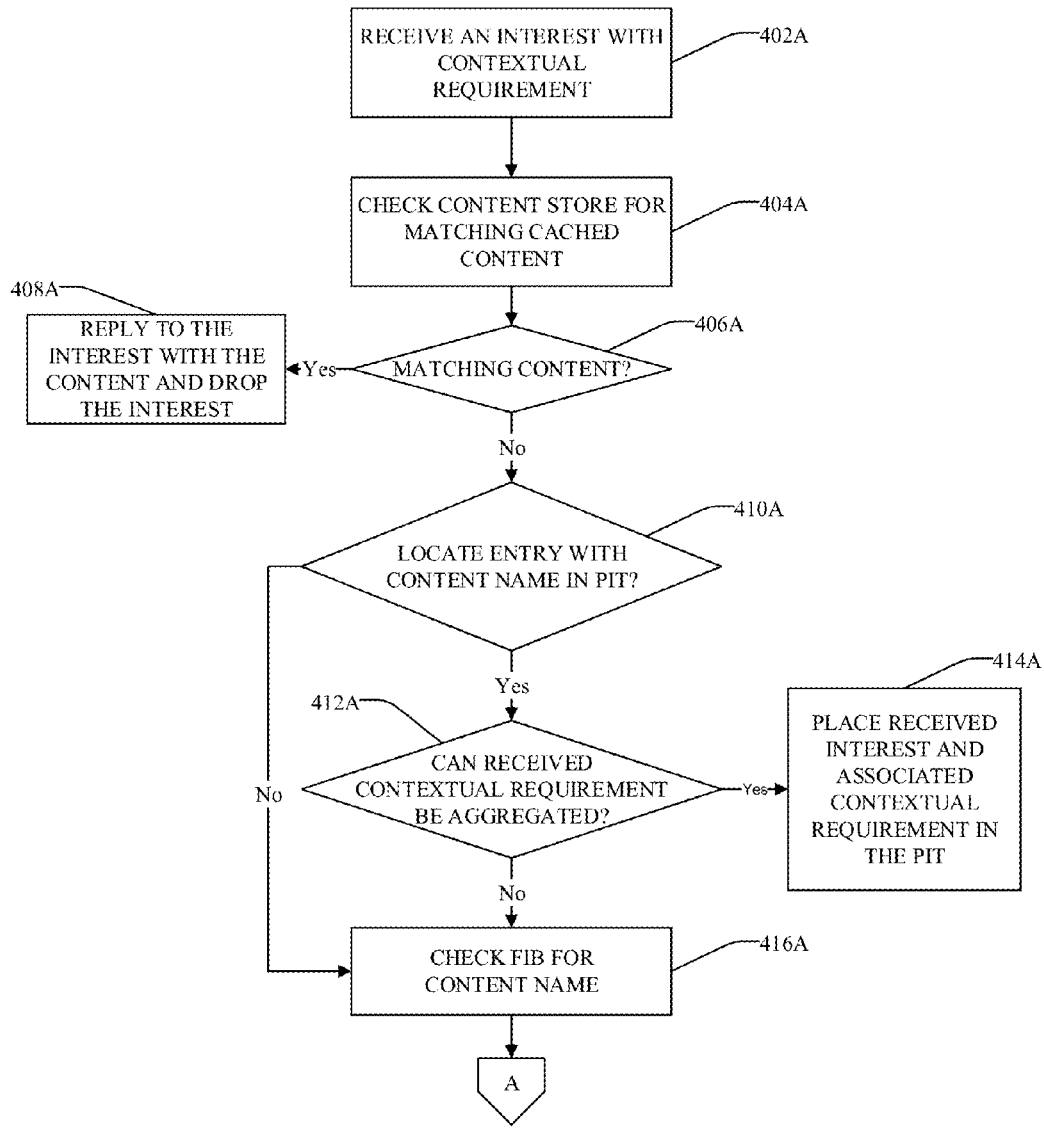
FIG. 4A illustrates a flow diagram of a router receiving an Interest message in accordance with FIGS. 1 and 2.

FIG. 4A illustrates a flow diagram of a router receiving an Interest message in accordance with FIGS. 1 and 2. Specifically, the figure illustrates receipt of an Interest message with contextual requirements. At 402A, when an NDN router 100 receives an interest with contextual requirements (for example, includes conditions), the actions taken by the NDN router 100 include checking the CS 305 to determine whether matching content exists at 404A.

If it is determined by the NDN router 100 that matching content satisfying the contextual requirements is stored in the CS 305 at 406A, then the NDN router 100 returns the cached content to the client (requesting client) at 408A, and drops the interest. In addition to caching content in the CS 305, relevant context information may also be maintained in the CS 305.

On the other hand, if no matching content is stored in the CS 305, then the NDN router 100 determines whether an entry exists in the PIT 310 with the same content name at 410A. If such an entry exists in the PIT 310, then the NDN router 100 checks whether the contextual requirement received can be aggregated with the existing contextual requirement in the PIT 310 at 412A. For example, if the existing contextual requirement is "Size >1 GB," and the contextual requirement with the incoming Interest is "Size >500 M," then the incoming Interest can be aggregated. Accordingly, the incoming face of the incoming Interest and associated contextual requirement are added to the existing entry in the PIT 310.

Figure 4B:
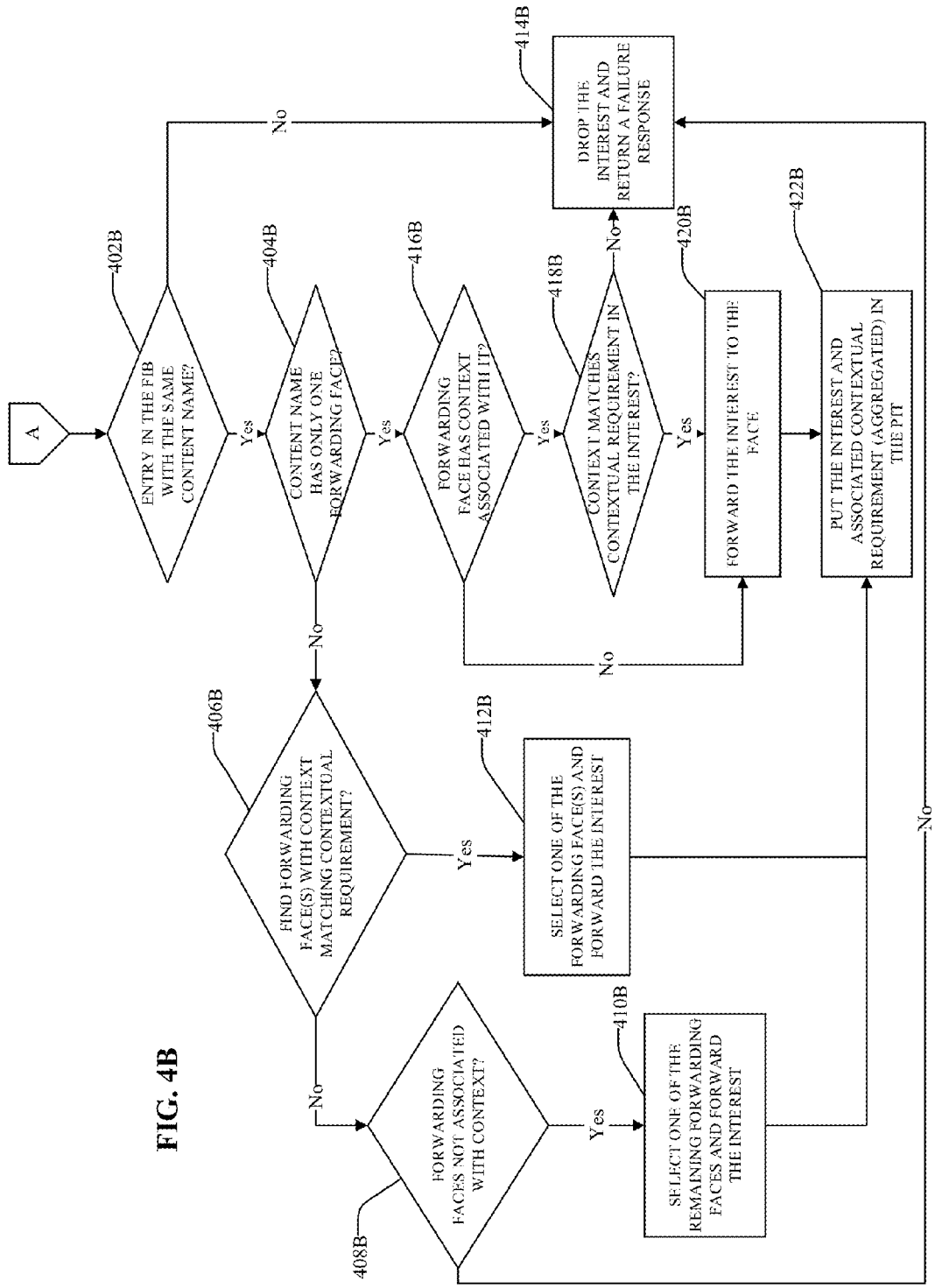
FIG. 4B illustrates a flow diagram of a router receiving an Interest message in accordance with FIGS. 1 and 2.

At 412A, if it is determined by the NDN router 100 that the contextual requirement cannot be aggregated with the existing contextual requirement in the PIT 310, or no entry exists in the PIT 310 with the same content name, then the NDN router 100 checks for a forwarding face (content name) in the FIB 315 for the incoming interest at 416A (and the process continues in FIG. 4B). If the contextual requirement can be aggregated with the existing contextual requirement, then the received interest and associated contextual requirement are placed in the PIT 310 at 414A.

FIG. 4B illustrates a flow diagram of a router receiving an Interest message in accordance with FIGS. 1 and 2. The process in the figure continues from the process described in FIG. 4A. In the example that follows, and as a result of the checking in 416A (FIG. 4A), the NDN router 100 determines whether an entry exists in the FIB 310 with the same content name as the Interest at 402B. If an entry exists, the NDN router 100 determines whether one or more forwarding face(s) is (are) found to be associated with the content name in the FIB 310 at 404B. It is appreciated, however, that this is merely an example and more than one forwarding face may be associated.

If the NDN router 100 determines that a single forwarding face exists at 404B, then the NDN router 100 determines whether the forwarding face has any associated context information at 416B. If it is determined by the NDN router 100 that no context information is associated with the forwarding face, then the NDN router 100 forwards the Interest to the face at 420B, and the Interest is placed in the PIT 310 along with the corresponding contextual requirement included in the Interest at 422B.

If the NDN router 100 determines that the forwarding face has associated context information at 416B, then the NDN router 100 checks whether associated context information opposes the client's specified contextual requirement 418B. That is, NDN router 100 matches the contextual requirement to the associated context information having the same context name at 418B. If other context information associated with the forwarding face having a different context name exists, the "other" context information is disregarded. For example, in the example in FIG. 3, the context name "example.com/movie1" has a contextual requirement of Size >1 GB for retrieving content. In the FIB 315, there are two (2) pieces context information associated with the forwarding face (face list=2). Accordingly, only the context information with name of "Size" is compared, whereas the "other" context information (e.g., resolution=1080 p) is disregarded.

If there is no match, then the NDN router 100 drops the Interest at 414B and returns a failure response to the client side. Optionally, the NDN router 100 may broadcast the Interest to the faces other than the one maintained in FIB 315 or the incoming face of the Interest.

If a match is determined to exist at 418B by the NDN router 100, then the NDN router 100 forwards the Interest to the face 420B. Subsequently, the Interest is placed in the PIT 310 at 422B, along with the corresponding contextual requirement included in the PIT 310, as aggregated content.

If the NDN router 100 determines that more than one forwarding face is associated with the content name at 404B, the NDN router 100 compares the contextual requirement with the context information associated with the forwarding faces 406B, and the NDN router 100 selects the face with the matching context 412B.

If no matching forwarding face exists at 406B, the NDN router 100 can exclude those faces that oppose the client's specified contextual requirement at 408B. Among the remaining faces determined at 408B, the NDN router 100 selects the forwarding face at 410B. Selection may occur using any known technique, such as randomly, based on criteria such as nearest distance, or in a round robin manner for server load balancing. The Interest is then placed in the PIT 310 at 422B, along with the corresponding contextual requirement.

Figure 5:
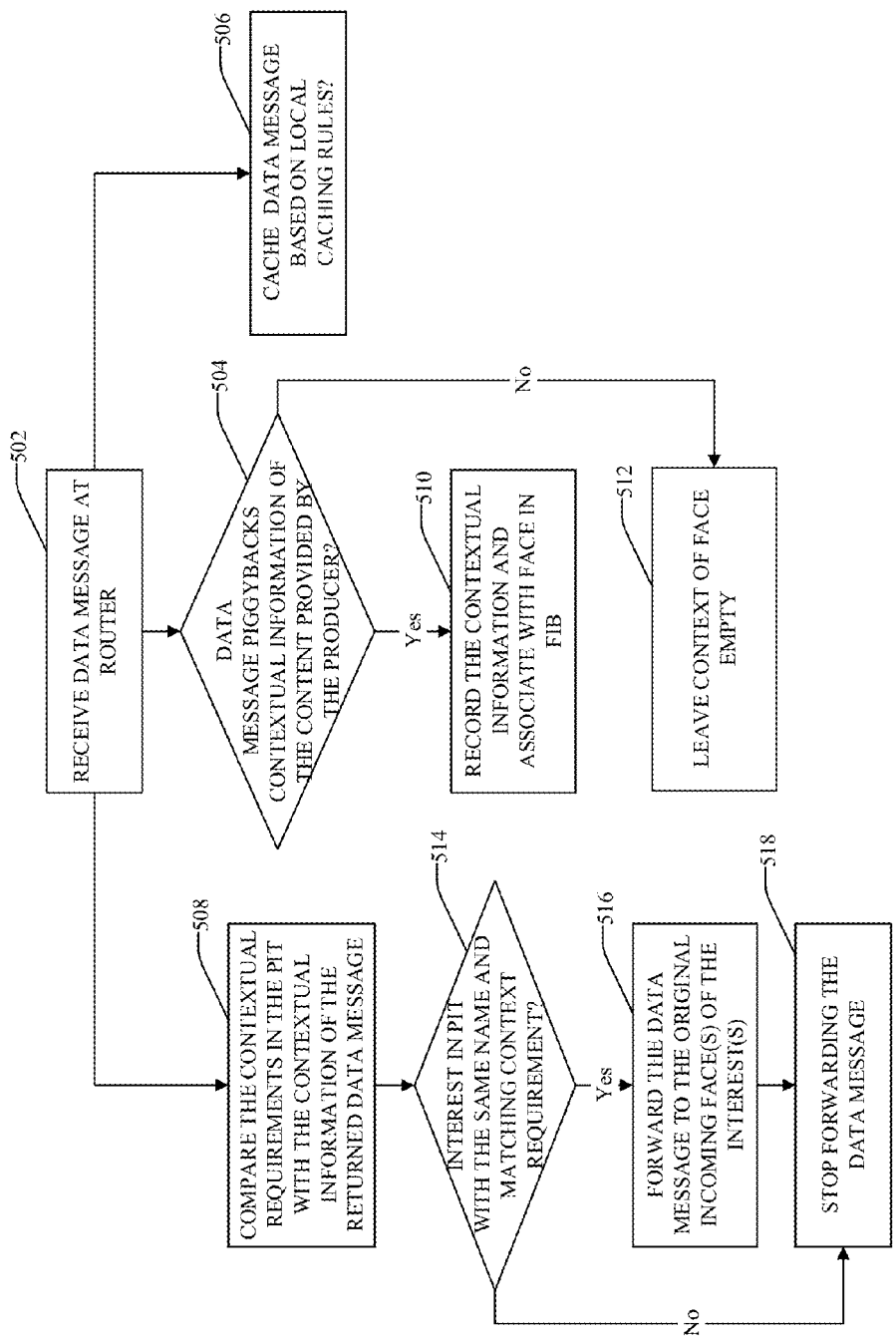
FIG. 5 illustrates a flow diagram of a router receiving a Data message in accordance with FIGS. 1 and 2.

FIG. 5 illustrates a flow diagram of a router receiving a Data message in accordance with FIGS. 1 and 2. When the Interest with the contextual requirement is received at the data producer that provides the content satisfying the contextual requirement, the data producer returns the content in the Data message following the same path back to the client side. In one embodiment, the data producer piggybacks the values pertaining to the same context name contained in the contextual requirement. For example, and with reference to FIG. 3, the contextual requirement is Size >1 GB for retrieving content with name "example.com/movie1." In this example, the data producer piggybacks (or attaches) the context information about the sizes of the content it can provide.

Thus, in one embodiment, when the NDN router 100 is in the path of the communication, it may learn the complete contextual information with the same name for the data producer. For example, the data producer can provide the content with the contextual information, such as 200 MB<Size<600 MB. This piggybacked information (the contextual information of the content that can be provided by the producer) contains the contextual information relevant to the same name (e.g., Size) to avoid destroying the Data message. In the meantime, the original contextual requirement may also piggybacked in the Data message (the contextual information of the returned data), such that NDN router 100 in the communication path is able to forward the Data message to the corresponding client side.

At 502, the NDN router 100 receives a Data message. At 508, the NDN router 100 compares the piggybacked contextual information of the returned data with the contextual information stored in the PIT 310 with the same content name. If a pending interest is stored in the PIT 310 with the same content name and matching contextual requirement at 514, then the Data message is forwarded to the original (originating) incoming face(s) of the Interest(s) at 516 (and forwarding of the Data message stops at 518). If no pending interest is found in the PIT 310, then the NDN router 100 stops forwarding the Data message at 518.

In parallel, the NDN router 100 carries out the remaining processes (504, 510, 512 and 506), which may be processed optionally in the background. For example, at 506, the NDN router 100 determines whether to cache the Data message based on the local caching criteria. At 504, the Data message (cached or not) is associated with the contextual information stored in the CS 305. If the Data message piggybacks the contextual information of the content (in one embodiment, with the same name of the originally requested content) that may otherwise be provided by the producer, then the NDN router 100 records the contextual information and associates it with the corresponding face in the FIB 315 at 520. If, on the other hand, there is no piggybacked contextual information of the content that can be provided by the producer as determined at 504, then the context of the face is left unspecified (empty) at 512.

Figure 6A:
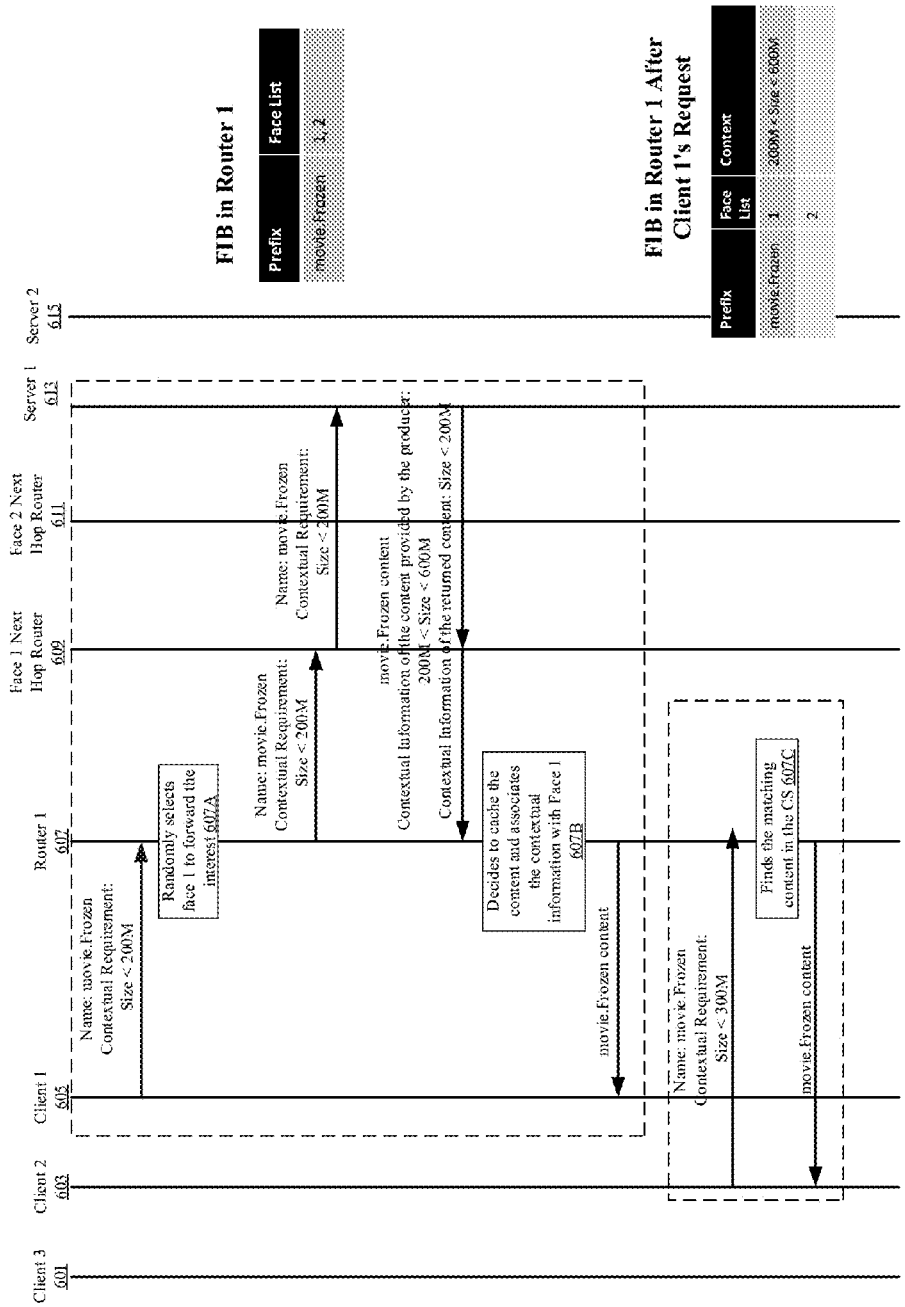
FIG. 6A illustrates a sequence diagram of updating a Forwarding Information Base in the router of FIG. 1.

FIG. 6A illustrates a sequence diagram of updating a Forwarding Information Base in the router of FIG. 1. The figure illustrates how a context-aware content request is supported in ICN networks, for example by NDN routers. It is appreciated that the example that follows is non-limiting. The sequence diagram shows multiple clients (e.g., client 1 (605), client 2 (603) and client 3 (601)), a router (e.g., router 1), multiple faces (e.g., face 1 next hop router 609 and face 2 next hop router 611) and multiple producers (e.g., server 1 (613) and server 2 (615)). In the figure, the dashed lines represent negotiations with a particular client.

Client 1 (605) sends an Interest with the content name (i.e., "movie.Frozen") and contextual requirement (i.e., Size <200 MB) to the attached router 1 (607). According to the data structure in the FIB 315 (prior to the client 1 (605) request being processed), the prefix "movie. Frozen" exists in router 1 (607), which has two forwarding faces, e.g. face 1 and 2 next hop routers 609 and 612, respectively, per the face list (see, for example, the table labeled "FIB in Router 1"). The router 1 (607) selects at 607A, for example randomly, one of the faces to forward the Interest. This limits the overhead in propagating the Interest message.

In the example, face 1 next hop router 609 is selected. The face 1 next hop 609 router then forwards the Interest to one of the producers, e.g., server 1 (613) or server 2 (615) (in this case, server 1 is selected). The server 1 (613) processes the Interest request, and extracts the content name and the contextual requirement. The server 1 (613) then determines, based on stored information, it can provide the content data with matching contextual information. The server 1 (613) replies with the content data, and piggybacks the contextual information of the content (i.e., 200 MB<Size<600 MB, which indicates all the sizes that the server 1 (613) is able to provide for the content "movie. Frozen") along with the original contextual requirement of the returned content (i.e., Size <200 MB). The content is forwarded via the reverse path to router 1 (607), and the router 1 (607) returns the content to the client 1 (605).

During the forwarding of content via the reverse path, the router 1 caches the forwarded content at 607B based on local caching criteria, where the cached content has contextual information of Size <200 MB. The router 1 associates the piggybacked contextual information to the forwarding face 1 next hop router 609 at 607B, and indicates that the content "movie.Frozen" with the contextual information of "200 MB<Size<600 MB" can be returned via face 1 next hop router 609, as indicated in the FIB 315 of router 1 (607) after processing the request from client 1 (605) (see, for example, the table labeled "FIB in Router 2 After Client 1's Request").

Subsequently, client 2 (603) sends an Interest with the content name (i.e., "movie.Frozen") and contextual requirement (i.e., Size <300 MB) to the attached router 1 (607). The router 1 (607) finds a local cached copy, based on the FIB 315 that was updated after the client 1 (605) request, which satisfies the contextual requirement, and returns the copy to the client 2 (603). The Interest is then dropped at the router 1 (607).

Figure 6B:
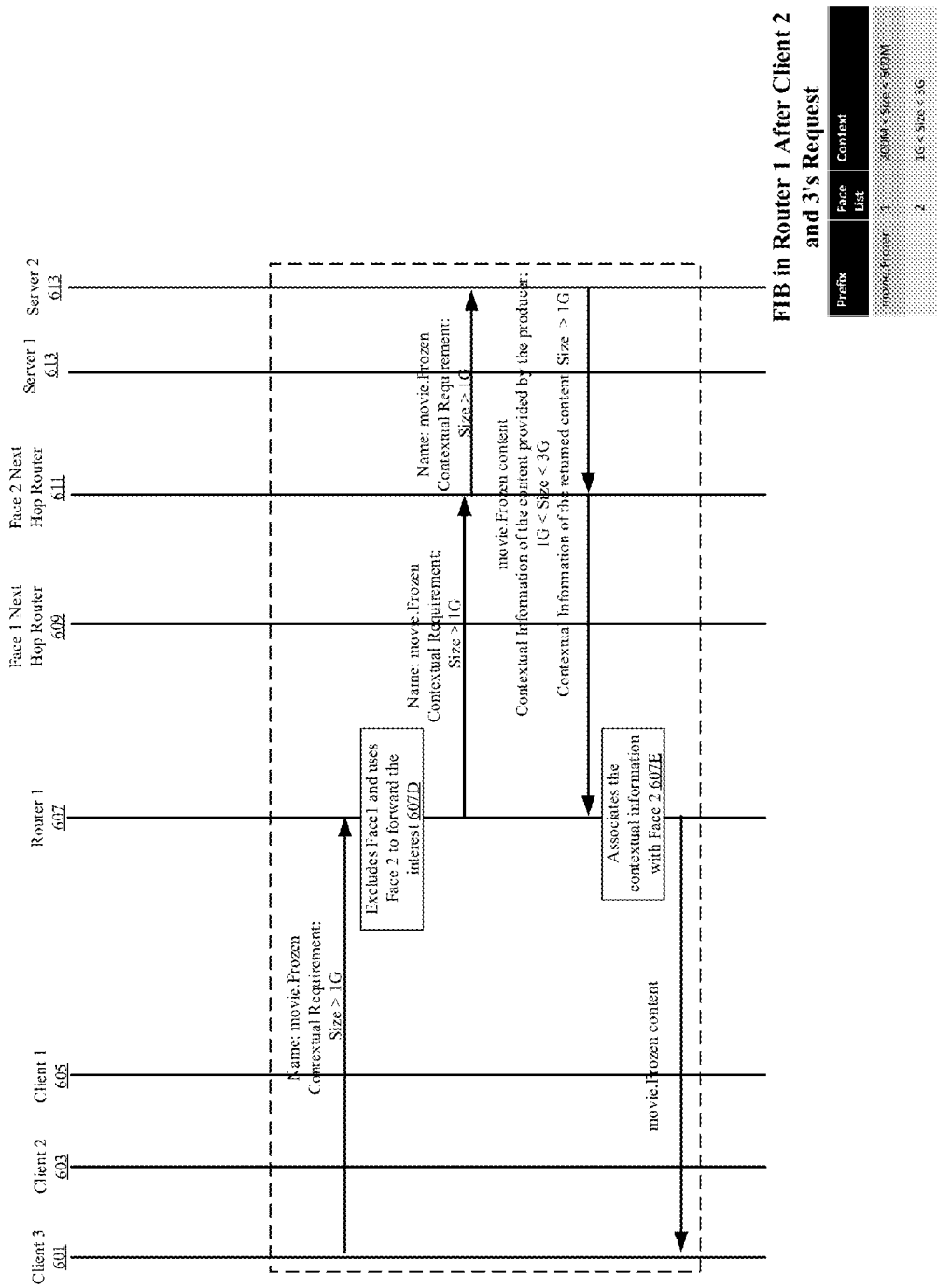
FIG. 6B illustrates a sequence diagram of updating a Forwarding Information Base in the router of FIG. 1.

FIG. 6B illustrates a sequence diagram of updating a Forwarding Information Base in the router of FIG. 1, and is a continuation of FIG. 6A. Following the client 2 (603) request processed at router 1 (607), client 3 (601) sends an Interest with the content name (i.e., "movie.Frozen") and contextual requirement (i.e., Size>1 GB) to the router 1

(607). The router 1 (607) is able to exclude (or hop) face 1 next hop router 609, and send the request to face 2 next hop router 611 at 607D, since the associated contextual information (i.e., 200 M<Size<600 M) in the FIB 315 does not satisfy the contextual requirement (i.e., Size>1 GB) of the Interest. The router 1 (607) is therefore considered "contextually aware" in making the decision to forward the Interest to the face 2 next hop router 611.

The face 2 next hop router 611 then forwards the Interest to one of the producers, e.g., server 1 (613) or server 2 (615) (in this case, server 2). The server 2 (615) processes the Interest request, and extracts the content name and the contextual requirement. The server 2 (615) determines, based on stored information, that it can provide the content data with matching contextual information. Accordingly, the server 2 (615) replies with the content data, and piggybacks the contextual information of the content (e.g., 1 GB<Size<3 GB, which indicates all the sizes that the server 2 (615) is able to provide for the content "movie.Frozen"), as well as the original contextual requirement of the returned content (e.g., Size>1 GB).

The content is forwarded via the reverse path to the router 1 (607). The router 1 (607) returns the content to the client 2 (603), and the router 1 (607) decides not to cache the content due to limited storage and based on local caching criteria). The router 1 (607) at 607E associates the piggybacked contextual information with the forwarding face 2 next hop router 611 and indicates that the content "movie.Frozen" with the contextual information of "1 GB<Size<3 GB" can be returned via the face 2 next hop router 611 (see, for example, the table labeled "FIB in Router 1 After Client 2 and 3's Request").

Figure 7:
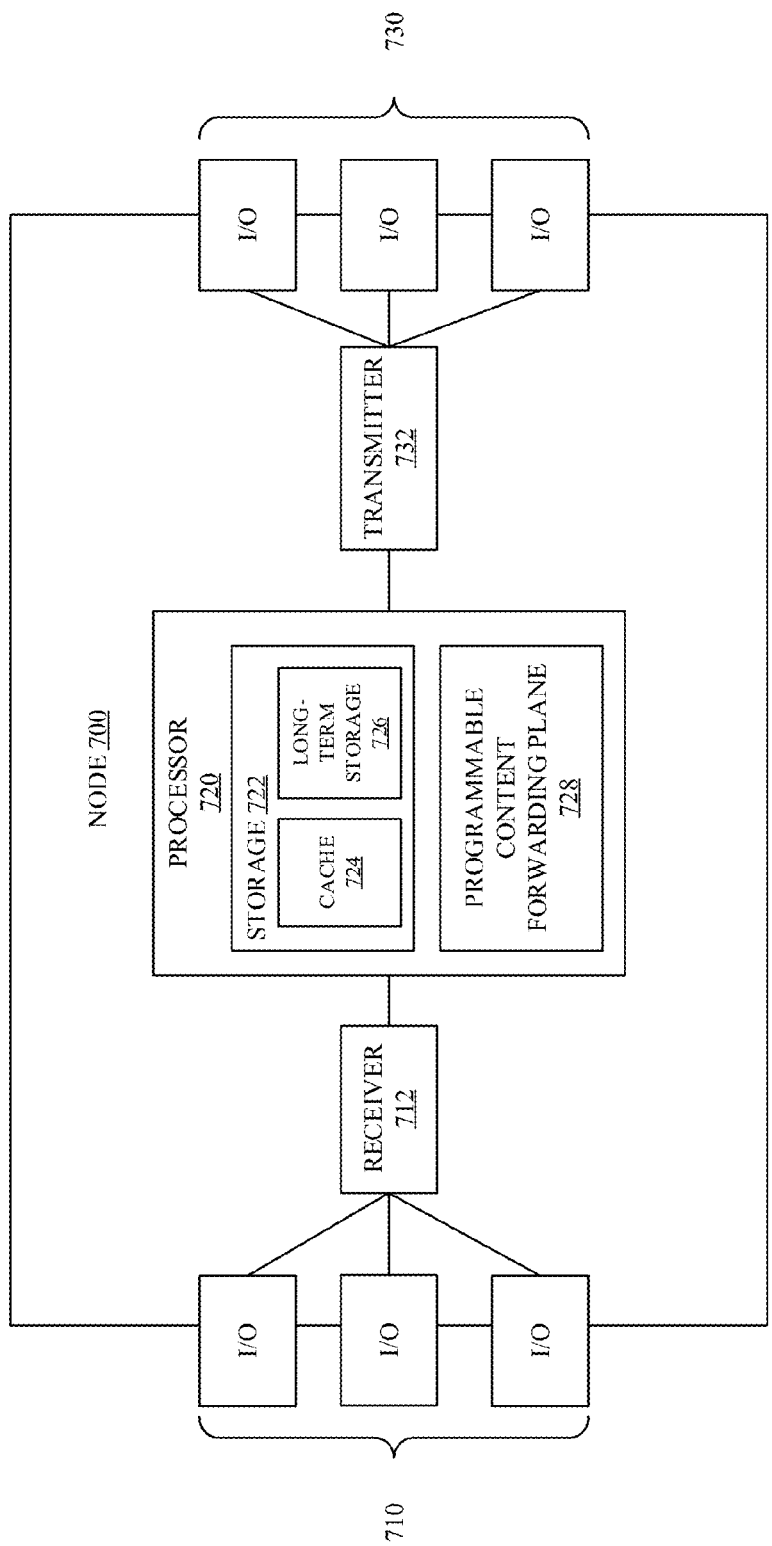
FIG. 7 illustrates an embodiment of a router in accordance with embodiments of FIGS. 1 and 2.

FIG. 7 illustrates an embodiment of a router in accordance with embodiments of the disclosure. The node (e.g., a router) 700 may be, for example, the content router 100 (FIG. 1) or any other node or router as described above in the ICN. The node 700 may comprise a plurality of input/output ports 710/730 and/or receivers (Rx) 712 and transmitters (Tx) 732 for receiving and transmitting data from other nodes, a processor 720 (or content aware unit), including a storage 722 and programmable content forwarding plane 728, to process data and determine which node to send the data. The node 700 may also receive Interest messages and Data messages as described above. Although illustrated as a single processor, the processor 720 is not so limited and may comprise multiple processors. The processor 720 may be implemented as one or more central processing unit (CPU) chips, cores (e.g., a multi-core processor), field-programmable gate arrays (FPGAs), application specific integrated circuits (ASICs), and/or digital signal processors (DSPs), and/or may be part of one or more ASICs. The processor 720 may be configured to implement any of the schemes described herein, such as the processes illustrated in FIGS. 3-6, using any one or combination of steps described in the embodiments. Moreover, the processor 720 may be implemented using hardware, software, or both.

The storage 722 (or memory) may include cache 724 and long-term storage 726, and may be configured to store routing tables, forwarding tables, or other tables or information disclosed herein. Although illustrated as a single storage, storage 722 may be implemented as a combination of read only memory (ROM), random access memory (RAM), or secondary storage (e.g., one or more disk drives or tape drives used for non-volatile storage of data).

The programmable content forwarding plane 728 may be configured to implement content forwarding and processing functions, such as at an application layer or L3, where the content may be forwarded based on content name or prefix and possibly other content related information that maps the content to network traffic. Such mapping information may be maintained in one or more content tables (e.g., CS, PIT, FIB) at the processor 720. The programmable content forwarding plane 728 may interpret user requests for content and accordingly fetch content, e.g., based on meta-data and/or content name (prefix), from the network or other content routers and may store the content, e.g., temporarily, in storage 722. The programmable content forwarding plane 728 may then forward the cached content to the user. The programmable content forwarding plane 728 may be implemented using software, hardware, or both and may operate above the IP layer or L2.

Figure 8:
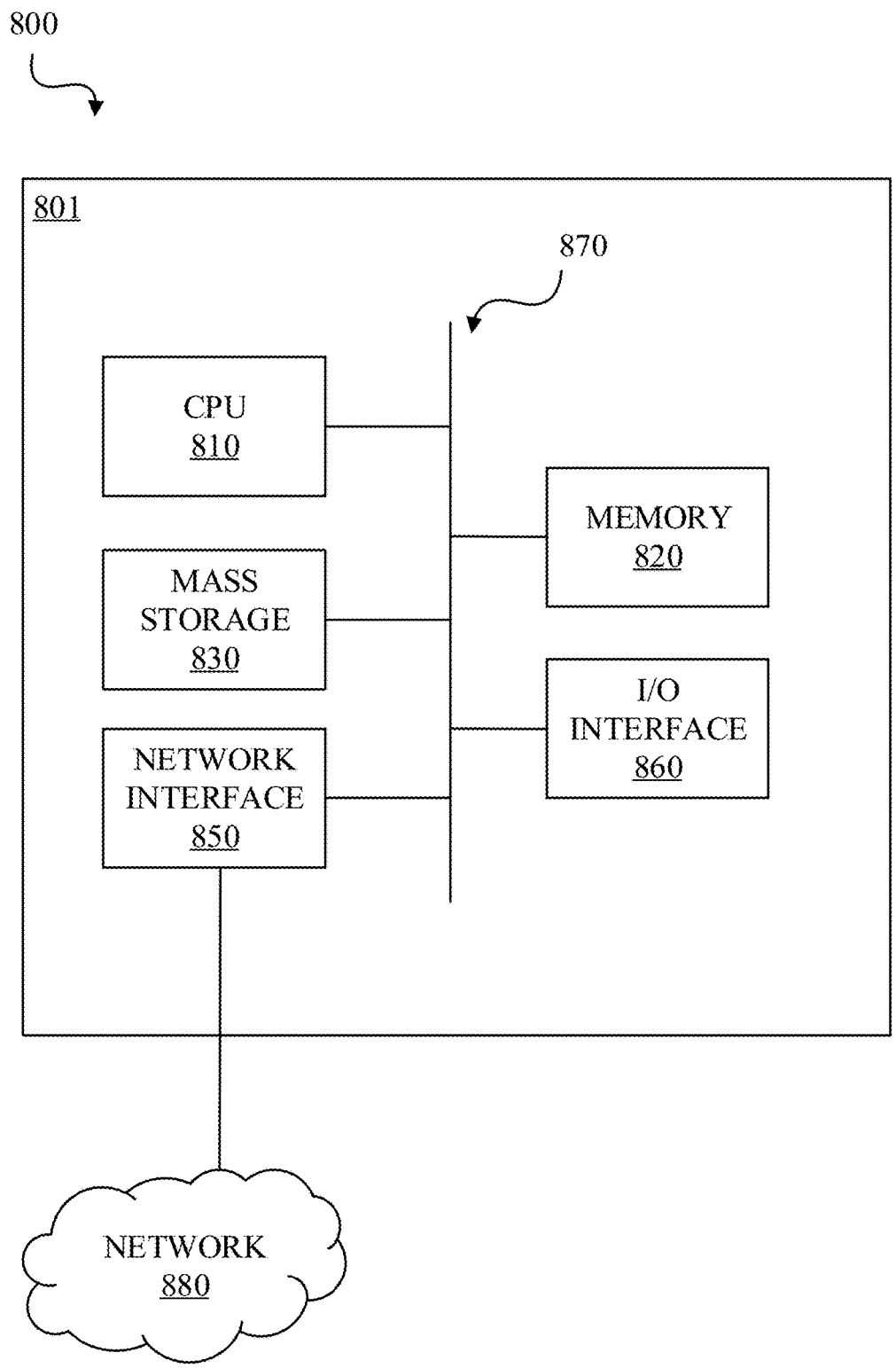
FIG. 8 illustrates a block diagram of a network system that can be used to implement various embodiments.

FIG. 8 is a block diagram of a network system that can be used to implement various embodiments. Specific devices may utilize all of the components shown, or only a subset of the components, and levels of integration may vary from device to device. Furthermore, a device may contain multiple instances of a component, such as multiple processing units, processors, memories, transmitters, receivers, etc. The network system may comprise a processing unit 801 equipped with one or more input/output devices, such as network interfaces, storage interfaces, and the like. The processing unit 801 may include a central processing unit (CPU) 810, a memory 820, a mass storage device 830, and an I/O interface 860 connected to a bus. The bus may be one or more of any type of several bus architectures including a memory bus or memory controller, a peripheral bus or the like.

The CPU 810 may comprise any type of electronic data processor. The memory 820 may comprise any type of system memory such as static random access memory (SRAM), dynamic random access memory (DRAM), synchronous DRAM (SDRAM), read-only memory (ROM), a combination thereof, or the like. In an embodiment, the memory 820 may include ROM for use at boot-up, and DRAM for program and data storage for use while executing programs. In embodiments, the memory 820 is non-transitory. The mass storage device 830 may comprise any type of storage device configured to store data, programs, and other information and to make the data, programs, and other information accessible via the bus. The mass storage device 830 may comprise, for example, one or more of a solid state drive, hard disk drive, a magnetic disk drive, an optical disk drive, or the like.

The processing unit 801 also includes one or more network interfaces 850, which may comprise wired links, such as an Ethernet cable or the like, and/or wireless links to access nodes or one or more networks 880. The network interface 850 allows the processing unit 801 to communicate with remote units via the networks 880. For example, the network interface 850 may provide wireless communication via one or more transmitters/transmit antennas and one or more receivers/receive antennas. In an embodiment, the processing unit 801 is coupled to a local-area network or a wide-area network for data processing and communications with remote devices, such as other processing units, the Internet, remote storage facilities, or the like.

In accordance with the embodiments, a mechanism is provided to support context awareness for content request in ICN architectures by: leveraging and building on the ICN architecture and fundamental design principles with minimum change to the protocols; routers can learn the context information of content and its producers without extra overhead; and routers are able to associate contextual information to forwarding faces for future content requests.

Accordingly, the system significantly decreases the network bandwidth on transporting the content that cannot satisfy client's requirements, routers can make the correct decision in choosing the forwarding face towards the content that meets the client's contextual requirements, which reduces the content request failures and routers do not need to multicast the interest message to all forwarding faces if they exist, which reduces the network bandwidth in transporting it as well as control states maintained by each involved router.

As a result of the context-aware content mechanisms discussed above, several advantages are provided including, but not limited to (1) context awareness from client's side using the interest message format with optional contextual requirements represented in conditions, where the condition is represented by context name, operator and context value; (2) supports the context awareness from router's side by processing an Interest message with contextual requirements from a client, deciding on the forwarding face by matching the contextual requirement to the context information of the faces, aggregating pending interests by the overlapping of contextual requirements, and processing a data message, associating the context information learned from the corresponding pending interest or piggybacked from the producer; and (3) supports the context awareness from content producer's side by processing an Interest message with contextual requirements, and piggybacking relevant context information of the requested content in the data message.

Additionally, the mechanisms disclosed above provide context awareness in the content request, the solutions make the ICN protocols (e.g. NDN protocols and primitives) more suitable as the underlying protocols for IoT applications, do not require content producers to explicitly broadcast all context information of all content in the entire network, and context information of content and its producer can be implicitly learned by the routers. Thus, the solutions enable the routers to make correct decisions on the forwarding face towards a content producer which can provide the content with required context, and eliminate the multicasting of interest message to all forwarding faces, which reduces the control states maintained by routers.

In accordance with various embodiments of the present disclosure, the methods described herein may be implemented using a hardware computer system that executes software programs. Further, in an exemplary, non-limited embodiment, implementations can include distributed processing, component/object distributed processing, and parallel processing. Virtual computer system processing can be constructed to implement one or more of the methods or functionalities as described herein, and a processor described herein may be used to support a virtual processing environment.

Aspects of the present disclosure are described herein with reference to flowchart illustrations and/or block diagrams of methods, apparatuses (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

The terminology used herein is for the purpose of describing particular aspects only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The aspects of the disclosure herein were chosen and described in order to best explain the principles of the disclosure and the practical application, and to enable others of ordinary skill in the art to understand the disclosure with various modifications as are suited to the particular use contemplated.

For purposes of this document, each process associated with the disclosed technology may be performed continuously and by one or more computing devices. Each step in a process may be performed by the same or different computing devices as those used in other steps, and each step need not necessarily be performed by a single computing device.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method for supporting context-aware content retrieval in a network, comprising:
   receiving, by a network node, an interest message including a content name and a contextual requirement that identifies one or more conditions satisfied by content;
   accessing a memory by the network node, the memory including at least one of a content store caching the content, a pending interest table (PIT) tracking pending interest messages and a forwarding information base (FIB) associating contextual information with one or more interfaces, to determine whether the content name of the interest message matches a content name stored in the memory;
   in response to a content name stored in the memory matching the content name of the interest message, the network node determining whether one or more of the interfaces stored in the FIB are associated with the content name in the interest message and matching the contextual requirement in the interest message with the contextual information associated with the one or more interfaces stored in the FIB that satisfies the one or more conditions;
   forwarding, by the network node, the interest message to one of the one or more interfaces for which the contextual requirement in the interest message matches the contextual information of the one or more interfaces corresponding to the content that satisfies the conditions; and aggregating, by the network node, the forwarded interest message including the contextual requirement with the interest message pending in the PIT, and storing the aggregated messages as aggregated content in the PIT.

2. The method of claim 1, further comprising by the network node:
accessing the content store to identify whether the content stored in the memory matches the content of the interest message;
in response to identifying matching content, responding to the interest message with the content from the content store and dropping the interest message.

3. The method of claim 1, wherein the content name is associated with one of the one or more interfaces, further comprising by the network node:
determining whether the interface is storing the contextual information;
determining whether the contextual information of the interface satisfies the contextual requirement of the interest message in response to the interface having the contextual information, and
performing the forwarding in response to the contextual information of the interface satisfying the contextual requirement of the interest message, and
dropping the interest message and transmitting a failure response in response to the contextual information of the interface failing to satisfy the contextual requirement of the interest message; and
in response to the interface failing to have the contextual information, performing the forwarding.

4. The method of claim 1, wherein the content name is associated with more than one of the interfaces, further comprising by the network node:
accessing the FIB to locate the one or more interfaces storing the contextual information satisfying the contextual requirement of the interest message, and
selecting one of the one or more interfaces and performing the forwarding in response to the one or more interfaces storing the contextual information satisfies the contextual requirement of the interest message, and
performing the forwarding in response to the one or more interfaces failing to store a contextual information.

5. The method of claim 1, further comprising by the network node:
receiving a data message including the aggregated content; and
storing the data message in the memory according to local caching rules.

6. The method of claim 1, further comprising by the network node:
receiving a data message including the aggregated content; and
determining whether the contextual information of the content provided by a content producer is attached to the data message, and
associating the contextual information with a corresponding one of the one or more interfaces and recording the contextual information in the FIB in response to the contextual information attached to the content of the data message, wherein
the contextual information is not recorded in the FIB according to the determination whether the contextual information of the content provided by the content producer is attached to the data message.

7. The method of claim 1, further comprising by the network node:
receiving a data message including the aggregated content;
comparing the contextual requirement stored in the PIT with the contextual information of the received data message; and
determining whether the content name and contextual requirement of the interest message stored in the PIT matches the content name and the contextual requirement of the content of the received data message, and
forwarding the data message to an originating interface of the interest message in response to the content name and contextual requirement of the interest message stored in the PIT matching the content name and the contextual requirement of the content of the received data message, and terminating forwarding of the data message in response to the content name and contextual requirement of the interest message stored in the PIT failing to match the content name and the contextual requirement of the content of the received data message.

8. The method of claim 1, wherein the network is an information centric network and the one or more interfaces are forwarding interfaces.

9. The method of claim 1, further comprising:
accessing the content store to identify whether the content stored in the memory matches the content of the interest message;
in response to failing to identify matching content, locating an entry stored in the PIT having a content name that matches the content name of the interest message.

10. The method of claim 9, wherein a matching entry is stored in the PIT and the locating the entry in the PIT further comprises by the network node:
determining the contextual requirement received with the interest message satisfies the contextual requirement stored in the PIT, and
aggregating the interest message including the contextual requirement with the interest message pending in the PIT in response to the contextual requirement of the interest message satisfying the contextual requirement stored in the PIT, wherein
the one or more interfaces stored in the FIB are accessed to determine whether the content name of the received interest message matches the content name of the one or more interfaces stored in the FIB according to the determination whether the contextual requirement received with the interest message satisfies the contextual requirement stored in the PIT.

11. A network component accessing context-aware content in a network, comprising:
a transceiver configured to receive and forward an interest message and content in the network;
a memory storing a content store to cache content, a pending interest table (PIT) to track pending interest messages for content, and a forwarding information base (FIB) for associating contextual information with one or more interfaces; and
a processor coupled to the memory and the transceiver configured to:
access the memory to determine whether a content name of the interest message matches a content name stored in the memory;
in response to a content name stored in the memory matching the content name of the interest message, determine whether one or more of the interfaces stored in the FIB are associated with the content name in the interest message and matching a contextual requirement, identifying one or more conditions satisfied by the content, in the interest message with the contextual information associated with the one or more interfaces stored in the FIB that satisfies the one or more conditions;

forward the interest message to one of the one or more interfaces for which the contextual requirement in the interest message matches the contextual information of the one or more interfaces corresponding to the content that satisfies the conditions; and aggregate the forwarded interest message including the contextual requirement with the interest message pending in the PIT, and storing the aggregated messages as aggregated content in the PIT.

12. The network component of claim 11, wherein the processor is further configured to:

access the content store to identify whether the content stored in the memory matches the content of the interest message;

in response to failing to identify matching content, locate an entry stored in the PIT having a content name that matches the content name of the interest message.

13. The network component of claim 12, wherein the locate the entry in the PIT further comprises:

when a matching entry is stored in the PIT, determine whether the contextual requirement received with the interest message satisfies the contextual requirement stored in the PIT, and when the contextual requirement of the interest message satisfies the contextual requirement stored in the PIT, aggregate the interest message including the contextual requirement with the interest message pending in the PIT; and otherwise, access the one or more interfaces stored in the FIB to determine whether the content name of the received interest message matches the content name of the one or more interfaces stored in the FIB.

14. The network component of claim 11, wherein, when the content name is associated with one of the one or more interfaces, wherein the processor is further configured to:

determine whether the interface is storing the contextual information;

in response to the interface having the contextual information, determine whether the contextual information of the interface satisfies the contextual requirement of the interest message, and when the contextual information of the interface satisfies the contextual requirement of the interest message, perform the forwarding, and when the contextual information of the interface fails to satisfy the contextual requirement of the interest message, drop the interest message and transmitting a failure response; and in response to the interface failing to have the contextual information, performing the forwarding.

15. The network component of claim 11, wherein, when the content name is associated with more than one of the interfaces, wherein the processor is further configured to:

access the FIB to locate the one or more interfaces storing the contextual information satisfying the contextual requirement of the interest message, and when one or more interfaces storing the contextual information satisfies the contextual requirement of the interest message, select one of the one or more interfaces and performing the forwarding, and when the one or more interfaces fail to store a contextual information, perform the forwarding.

16. The network component of claim 11, wherein the processor is further configured to:

receive a data message including the aggregated content; and store the data message in the memory according to local caching rules.

17. The network component of claim 11, wherein the processor is further configured to:

receive a data message including the aggregated content; and determine whether the contextual information of the content provided by a content producer is attached to the data message, and when the contextual information is attached to the content of the data message, associate the contextual information with a corresponding one of the one or more interfaces and recording the contextual information in the FIB, and when the contextual information is not attached to the content of the data message, the contextual information is not recorded in the FIB.

18. The network component of claim 11, wherein the processor is further configured to:

receive a data message including the aggregated content;

compare the contextual requirement stored in the PIT with the contextual information of the received data message; and determine whether the content name and contextual requirement of the interest message stored in the PIT matches the content name and the contextual requirement of the content of the received data message, and when the content name and contextual requirement of the interest message stored in the PIT matches the content name and the contextual requirement of the content of the received data message, forward the data message to an originating interface of the interest message, and when the content name and contextual requirement of the interest message stored in the PIT fails to match the content name and the contextual requirement of the content of the received data message, terminate forwarding of the data message.

19. The network component of claim 11, wherein the network is an information centric network and the one or more interfaces are forwarding interfaces.

20. A non-transitory computer-readable medium storing computer instructions for supporting context-aware content retrieval in a network, that when executed by one or more processors, cause the one or more processors to perform the steps of:

receiving an interest message including a content name and a contextual requirement that identifies one or more conditions satisfied by content;

accessing a memory, the memory including at least one of a content store caching content, a pending interest table (PIT) tracking pending interest messages and a forwarding information base (FIB) associating contextual information with one or more interfaces, to determine whether the content name of the interest message matches a content name stored in the memory;

in response to a content name stored in the memory matching the content name of the interest message, determining whether one or more of the interfaces stored in the FIB are associated with the content name in the interest message and matching the contextual requirement in the interest message with the contextual information associated with the one or more interfaces stored in the FIB that satisfied the one or more conditions;

forwarding the interest message to one of the one or more interfaces for which the contextual requirement in the interest message matches the contextual information of the one or more interfaces corresponding to the content that satisfies the conditions; and aggregating the forwarded interest message including the contextual requirement with the interest message pending in the PIT, and storing the aggregated messages as aggregated content in the PIT.

* * * * *